United States Patent [19]

Nakamura

[11] 3,955,989
[45] May 11, 1976

[54] CRYSTALLIZED GLASS ARTICLE HAVING A SURFACE PATTERN

[75] Inventor: Shigeharu Nakamura, Otsu, Japan

[73] Assignee: Nippon Electric Glass Company, Limited, Tokyo, Japan

[22] Filed: Oct. 10, 1974

[21] Appl. No.: 513,736

Related U.S. Application Data

[63] Continuation of Ser. No. 325,317, Jan. 22, 1973, abandoned.

[30] Foreign Application Priority Data

Jan. 22, 1972 Japan.................................. 47-8039

[52] U.S. Cl................................. 106/39.6; 65/33; 264/125
[51] Int. Cl.². ....................................... C03C 3/22
[58] Field of Search .................. 106/39.6, 51; 65/33

[56] References Cited

UNITED STATES PATENTS

| | | | |
|---|---|---|---|
| 3,673,049 | 6/1972 | Giffen et al........................ | 106/39.6 |
| 3,761,235 | 9/1973 | Yamanaka et al..................... | 65/33 |
| 3,841,856 | 10/1974 | Bondarev et al............... | 106/39.6 X |

*Primary Examiner*—Helen M. McCarthy
*Attorney, Agent, or Firm*—Kurt Kelman

[57] ABSTRACT

A crystallized glass article having a surface pattern like granite, marble or other natural stones, which is formed of a crystallizable glass material and is characterized by the existence of numerous needle-like $\beta$-wollastonite crystals in various directions in a surface layer of the article. The crystallized glass article is produced by a heat-treatment of collected small crystallizable glass masses.

9 Claims, 6 Drawing Figures

CRYSTALLIZED GLASS ARTICLE HAVING A SURFACE PATTERN

This is a continuation of application Ser. No. 325,317, filed Jan. 22, 1973, now abandoned.

BACKGROUND OF THE INVENTION

This invention relates to crystallized glass articles having surface patterns imparting to them an appearance such as granite, marble or other natural stones.

Crystallized glasses formed by the heat treatment of glasses have attracted great attention as heat-resistant, incombustible wall materials for buildings and the like because of great mechanical strength, excellent heat resistance and excellent efflorescence resistance. Especially, a crystallized glass obtained by heat-treating molded article of a glass of the $CaO-Al_2O_3-SiO_2$ type free of a nucleating agent, as disclosed in U.S. Patent No. 3,761,235, has a beautiful appearance of a pattern resembling that of a natural stone material such as marble, due to needle-like crystals of $\beta$-wollastonite being precipitated and grown to extend from the glass surface into the interior. Such a crystallized glass is a very valuable heat-resistant, incombustible wall material.

Further, a glass composition of this type improved in the workability of the crystallizable glass, the crystallizing rate and the like is disclosed in commonly owned copending U.S. Pat. application No. 539,160 filed Jan. 2, 1975.

In each of above patent Patent Application, the primary object is to obtain an appearance resembling that of marble.

SUMMARY OF THE INVENTION

An object of this invention is to provide a crystallized article having a more complicated, desirable pattern resembling that of natural granite or the like.

In accordance with this invention, a crystallized glass article having needle-like crystals oriented in various directions in surface the glass article layer of are obtained.

In producing such glass article, there are prepared small masses of a crystallizable glass which has such a property that, when it is heat-treated at a temperature higher than the softening point thereof, needle-like crystals are precipitated and grow from the surface into the interior in a direction normal to the surface while it is being softened and deformed. The small masses of the crystallizable glass are collected or packed in a mold such as a dish, and are subjected to a heat-treatment at a temperature higher than the softening point thereof until the needle-like crystals are present and the small masses are fusion-bonded to form an integrated article body.

Since needle-like crystals are precipitated and grow from the surface of each mass of the crystallizable glass into the interior thereof in a direction normal to the surface, the integrated article body has needle-like crystals in various directions so that the appearance of the article has a desirable complicated pattern resembling that of granite, marble or other natural stone because light is transmittable in a direction of the needle-like crystal and is not transmittable in the other directions. Thus, a region of the surface of the article in which the needle-like crystals are grown in a direction normal to the surface, may have light-transparency, and another region in which the needle-like crystals are grown in a parallel direction to the surface, may be substantially opaque.

It should be noted that the small masses of glass referred to in this invention are glass materials having a size smaller than that of the intended article. Small products crushed by means of water quenching, granules, small balls, small crushed pieces, solid rods, etc. are included in such small masses, as well as powder glass.

The types of crystallizable glass useful herein may be the $CaO-Al_2O_3-SiO_2$ systems disclosed in the above-mentioned patent and $CaO-Al_2O_3-SiO_2-ZnO$ systems disclosed in the above-mentioned Patent Application.

Further objects and features of this invention will be understood from the detailed description of certain embodiments of this invention, with reference the annexed drawings.

BRIEF DESCRIPTION OF THE INVENTION

FIG. 1 is a sectional view illustrating small glass balls accumulated in Example 1, FIG. 2 is a sectional view illustrating the even plate obtained in Example 1, FIG. 3 is a view illustrating the upper surface of the plate shown in FIG. 2, FIG. 4 is a view illustrating the upper surface of the crystallized glass plate obtained in Example 2, FIG. 5a is a sectional view illustrating the assembly of accumulated small masses of a glass according to Example 4, FIG. 5b shows the upper surface of the crystallized glass article of Example 4.

DETAILED DESCRIPTION OF THE PREFERRED EMBODIMENTS

In following embodiments, the production of glass plates as crystallized glass articles will be described, and glass materials comprising 19.1% of CaO, 6.8% of $Al_2O_3$, 59.1% of $SiO_2$, 1.7% of $K_2O$, 1.7% of $Na_2O$, o.6% of $B_2O_3$, 6.8% of ZnO and 4.3% of BaO are used. This glass can readily be obtained by heating the batch at 1400° – 1500°C. The viscosity of the glass is $10^2$ poise at 1440°C, $10^{2.6}$ poise at 1310°C, $10^3$ poise at 1240°C and $10^4$ poise at 1105°C. This glass is characterized by a density of 2.78 g/cm³ as measured at 15°C, a thermal expansion coefficient of $68.8 \times 10^{-7}$/°C, a liquidus temperature of 1229°C, a strain point of 628°C, an annealing temperature of 666°C and a softening point of 845°C. When a small mass of this glass is heated from room temperature at a rate of 120°C per hour, the softening of the glass begins at a temperature exceeding about 850°C and the corner portion of the small mass becomes round and is further deformed with elevation of the temperature. At about 1000°C, crystals are slightly precipitated from the surface toward the interior, and at about 1150°C flow deformation is advanced and crystals grow from the surface toward the interior along a length of about 1.5 mm. When the small mass is maintained at this temperature for 1 hour, the crystals grow to have a length of about 5 mm. It was found by an X-ray diffraction method that, when the growth of the needle-like crystals had reached to the interior, the small mass had crystals of 35 to 40%.

EXAMPLE 1

Figure 1:
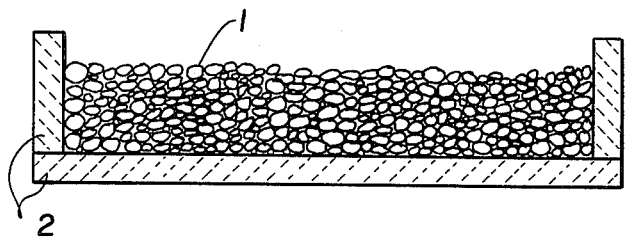
Figure 2:
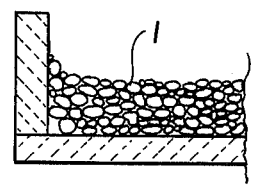
Figure 3:
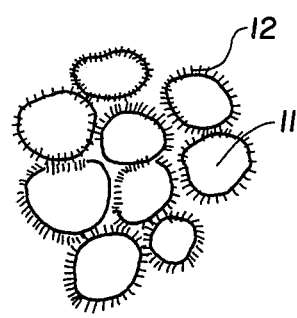

84 Kg of small balls of a crystallizable glass of the above-mentioned composition (which will be referred to merely as "glass" hereinafter) having a diameter of 2 to 5 mm were collected and accumulated on a plate surrounded by a frame of 100 cm × 100 cm. This is illustrated in FIG. 1 where numeral 1 indicates small balls of the glass and numeral 2 indicates a frame of a refractory plate for collecting the small balls of the glass in a described dimension. $Al_2O_3$ or other refractory powder was coated on the surface of this refractory plate in order to prevent the glass from adhering to the refractory plate during the crystallizing treatment. The so collected small balls were placed into a furnace and heated to 1150°C at a temperature-elevating rate of 120°C per hour, and maintained at this temperature for about 5 minutes, following which the cooling was conducted at a rate of 100°C per hour. Thus, small balls of the glass were fusion-bonded to one another and integrated into a patterned glass plate having a dimension of 100 cm × 100 cm × 3 cm which was crystallized and had a smooth surface. The section of the so obtained glass plate is shown in FIG. 2, where small balls 1 of the glass have been fusion-bonded and integrated after having been softened and deformed during the heat treatment. The surface of the so obtained crystallized glass plate is illustrated in FIG. 3, where numeral 11 indicates the portion in which crystals of β-wollastonite grow almost normally to the surface and which has a semi-transparency, and numeral 12 indicates the portion in which crystals of β-wollastonite grow amost in parallel to the surface and which is devitrified and appears relatively white.

EXAMPLE 2

Figure 4:
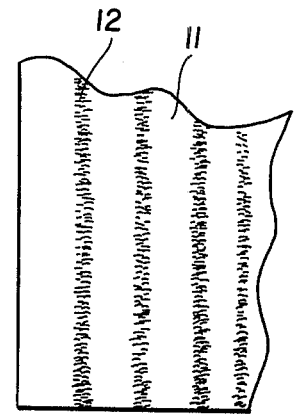

84 Kg of solid rods of glass having a diameter of 2 to 5 mm and a length of 100 cm were collected and accumulated on a plate of 100 cm × 100 cm in the same manner as in Example 1, and were heated to 1150°C at a rate of 120°C per hour and maintained at this temperature for about 5 minutes, following which the cooling was conducted at a rate of about 100°C per hour. Thus, the solid rods of the glass were fusion-bonded to one another and integrated to form a glass plate of 100 cm × 100 cm × 3 cm which was crystallized and had a smooth surface with a pattern of vertical strips. The surface condition of the so obtained glass plate is illustrated in FIG. 4 where numeral 11 indicates the portion having a relatively high light transmission and numeral 12 indicates the portion which appears relatively white.

EXAMPLE 3

84 Kg of small crushed glass products obtained by pouring molten glass into water and quenching it, were collected and accumulated on a plate of 100 cm × 100 cm in the same manner as in preceding Examples. The accumulated glass products were lightly pressed so that the surface of the accumulation was almost flat, and it was heated to 1150°C at a rate of 120°C per hour in an electric furnace and, immediately thereafter, it was cooled at a rate of 100°C per hour to obtain a crystallized glass plate of 100 cm × 100 cm × 3 cm having a smooth surface with a very beautiful pattern in which portions having a transparency and relatively white portions are tangled with each other in a very complicated manner.

In the preceding Examples, white crystallized glass articles were prepared by employing small masses of the glass of the same composition. In case a crystallized glass article having a colored pattern is prepared, an accumulation of glass masses is formed by mixing small masses of a colored glass with small masses of the glass used in the preceding Examples, and then it is subjected to the heat treatment. By these procedures, crystallized glass articles having a pattern of an optional color can readily be obtained. This embodiment will now be illustrated in more detail by reference to the following Examples.

EXAMPLE 4

Figure 5A:
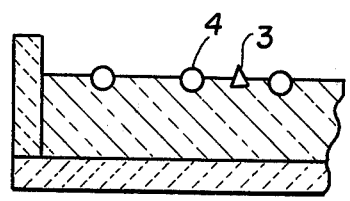
Figure 5B:
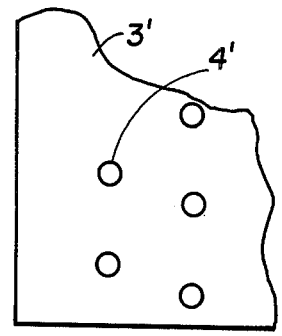

Small masses of the glass used in Example 3 and small balls of a black glass comprising 67% of $SiO_2$, 10.5% of $Al_2O_3$, 22.5% of CaO, 2.0% of $Na_2O$, 2.0% of $K_2O$, 2.0% of $B_2O_3$ and 5.0% of $Fe_2O_3$ were accumulated, as illustrated in FIG. 5a, and the heat treatment was conducted in the same manner as in Example 3 to obtain a beautiful, crystallized glass product having a pattern of small black spots. FIG. 5a illustrates the accumulation of small glass masses 3 of white glass and small balls 4 of the black glass and FIG. 5b indicates the surface of the resulting glass product in which numeral 3' indicates the white portion and numeral 4' indicates the black portion.

Moreover, crystallized glass articles having a beautiful, colored pattern can also be prepared easily by a method comprising spraying a solution containing coloring ions on the surfaces of small masses of glass, accumulating them and heat-treating the accumulated glass assembly, or by a method comprising applying a solution containing coloring ions on the surface of an accumulation of small masses of glass by a sprayer or the like and heat-treating the accumulation.

EXAMPLE 5

The small crushed glass products used in Example 3 were accumulated in the same manner as in Example 3, and an aqueous solution containing 10% of nickel chloride was scattered on the surface of the accumulation of small masses by means of a sprayer, following which the heat treatment was conducted to obtain a very beautiful, crystallized glass article having a pattern in which white portions, relatively white, transparent portions and brown portions are tangled with one another in a very complicated manner.

In each of the preceding Examples, embodiments where the surface of the resulting glass article is not especially polished are illustrated. However, the evenness of the surface of the crystallized glass article is influenced mainly by the properties of the glass and the heat treatment schedule. More specifically, in case the temperature at which crystals begin to be precipitated from the surface of small glass masses is higher by about 100°C than the softening point of the glass, the surface of the resulting crystallized glass article tends to be relatively level and even. Further, in case the temperature-elevating rate is relatively low at the heat-treating step, it is difficult to obtain an even surface. Of course, even in such case it is possible to obtain a product having a smooth surface free of small waves by polishing the surface.

Physical properties of the crystallized glass article obtained by the process of this invention are shown in Table 1.

Table 1

|  | Product Obtained by accumulation method | Product Obtained by rolling method | Natural marble | Granite |
| --- | --- | --- | --- | --- |
| Specific gravity | 2.7 | 2.7 | 2.7 | 2.7 |
| Bending strength (Kg/cm$^2$) | 450 | 430 | 30–250 | 150–170 |
| Shore hardness | 106 | 100 | 40–63 | 84–93 |
| Charpy impact strength | 2.9 | 2.6 | 1.0–1.3 | 1.7–2.1 |
| Thermal expansion coefficient (30–380°C) | $57 \times 10^{-7}$ | $57 \times 10^{-7}$ | $100$–$200 \times 10^{-7}$ | $83 \times 10^{-7}$ |

In Table 1, the product obtained by the rolling method means a crystallized glass product obtained by molding the glass according to the conventional roll molding and heat-treating the molded glass. From this Table, it is seen that the strength of the crystallized glass article of this invention is much higher than that of natural marble and is comparable to that of the crystallized glass article molded by the rolling method.

In the preceding Examples, only the preparation of plate articles is illustrated but it will readily be understood that an article of any form can be prepared by packing small masses of glass into a mold of a desired configuration and heat-treating them while packed in the mold.

What is claimed is:

1. A crystallized glass article consisting of an integral body of individual small masses of crystallized glass, the individual small masses being fusion-bonded along interfaces by heat-treating an accumulation of the individual small masses, a plurality of adjacent ones of the small masses forming a surface layer of the article, each of the fusion-bonded small masses having needle-like β-wollastonite crystals precipitated by the heat treatment and extending from the surface of the small mass into the interior thereof in a direction generally perpendicular to the surface of the small mass, the crystals being generally parallel to the surface of the glass article in the region of the interfaces between the adjacent fusion-bonded individual small masses and being generally perpendicular to the surface of the glass article in the region of the exposed surface portion of each small mass at the article surface between the interfaces whereby a surface pattern defined by the small masses forming the surface layer is imparted to the glass article and in which surface pattern parallel crystals appear as relatively opaque portions transmitting substantially no light and perpendicular crystals appear as semi-transparent or transparent portions having relatively high light transmission.

2. The crystallized glass article claimed in claim 1, wherein said small masses of crystallizable glass consist essentially of $SiO_2$, $Al_2O_3$, and CaO.

3. The crystallized glass article claimed in claim 1, wherein said small masses of crystallizable glass consist essentially of $SiO_2$, $Al_2O_3$, CaO and ZnO.

4. The crystallized glass article claimed in claim 1, wherein the surface pattern is created by small masses which prior to being fusion bonded were balls of crystallizable glass.

5. The crystallized glass article claimed in claim 1, wherein the surface pattern is created by small masses which prior to being fusion bonded were rods of crystallizable glass.

6. The crystallized glass article claimed in claim 1, wherein the surface pattern is created by small masses which prior to being fusion bonded were crushed pieces of crystallizable glass.

7. The crystallized glass article of claim 1 having coloring ions dispersed from the surface of the glass article and into the interior thereof.

8. The crystallized glass article of claim 1 in which the surface of the glass article is polished.

9. The article of claim 1 wherein at least some of the small masses include colorant ions prior to being fusion bonded.

* * * * *